March 13, 1928.  1,662,560
J. O. BOLT
STEERING DEVICE
Filed June 14, 1927
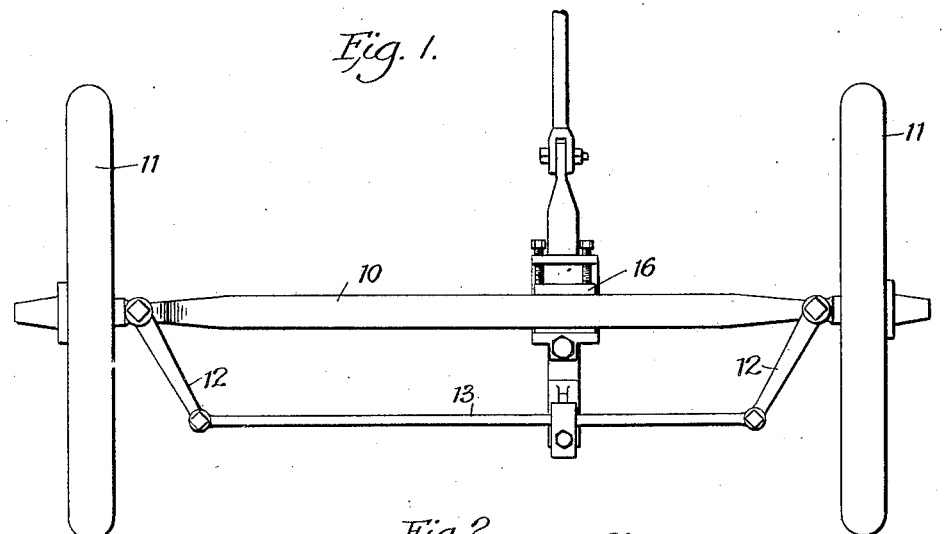
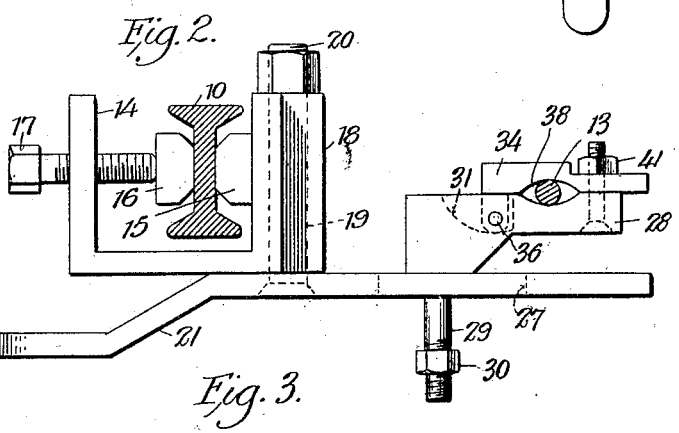
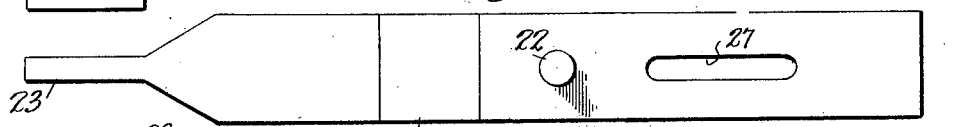
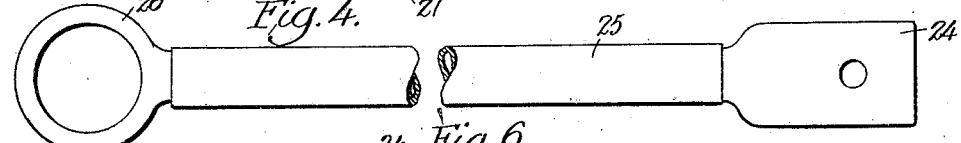
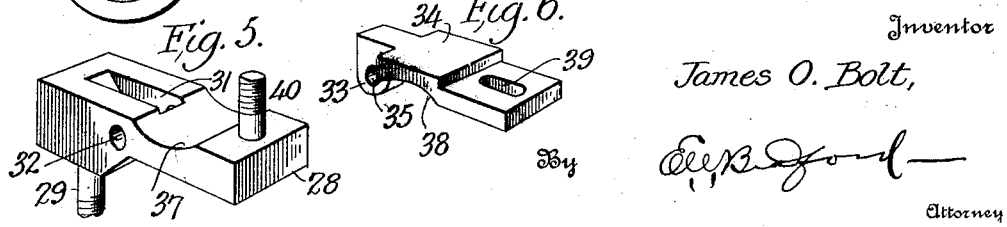
Inventor
James O. Bolt,
By
Attorney Patented Mar. 13, 1928.

1,662,560

UNITED STATES PATENT OFFICE.

JAMES OTIS BOLT, OF LEEDS, ALABAMA.

STEERING DEVICE.

Application filed June 14, 1927. Serial No. 198,851.

My invention relates to steering devices for automobiles and is adapted particularly to be applied to a disabled automobile when the same is being towed to a garage or the like.

It is an object of the invention to provide a simple and inexpensive device of this character by means of which an automobile or other trailing vehicle may be caused to make a broad turn similar to the front wheels of the towing vehicle whereby the trailing vehicle will avoid striking a post or other stationary object, all as will be hereinafter more particularly described and claimed.

Referring to the drawings which are made a part hereof and in which similar reference characters indicate similar parts:

Figure 1 is a top plan view of my device showing the manner in which it is applied, Figure 2, a side elevation of my device, Figure 3, a top plan view of a draft tongue, Figure 4, a side elevation of a tow bar, and Figure 5, a detail perspective of the clamp for the connecting rod for the steering arms.

In the drawings, reference character 10 indicates an automobile axle at each end of which is mounted a wheel 11 with which is associated a steering arm 12, which steering arms are connected by a tie rod 13, all of which are of conventional construction. The tie rod 13 is moved longitudinally by a connection with the steering wheel of the vehicle for controlling the path of the wheels 11.

My invention comprises a substantially U-shaped bracket 14 adapted to be applied about the axle 10 of the automobile and having a forwardly extending jaw 15 mounted upon rivets or the like at one side of the same for cooperation with the rearwardly extending jaw 16 supported by set screws 17 in the opposite sides of the U-shaped member and between which jaws 15 and 16, is adapted to be clamped the front automobile axle. The rear side of the U-shaped clamp which supports the jaw 15 is provided with a thickened wall or extension 18 having a vertical slot 19 in which is disposed a king bolt 20. A draft tongue 21 is provided with an opening 22 for the reception of the king bolt 20 upon which it is pivoted and the forward end of such draft tongue is offset to permit the same to turn slightly without interfering with the axle 10. The forward extremity of the draft tongue is provided with a flattened perforated portion 23 for pivotal connection with the bifurcated end 24 of a tow bar 25 having an eye 26 for the reception of a rope or the like by means of which the same may be fastened to the towing vehicle.

In order to cause the proper steering of the vehicle having the axle 10, I provide a longitudinally disposed slot 27 in the rear portion of the draft tongue 21 forwardly of the tie rod 13 and also provide a clamp 28 for attachment on the tie rod 13 said clamp having a depending stud 29 which projects through the slot 27 in the draft tongue 21 and which is provided with a nut 30 to prevent disengagement of the clamp from the tie rod. A slot 31 is provided in the upper portion of the clamp 28 for the reception of a depending tongue 33 carried by a pivoted member 34. An opening 32 is provided in the clamp 28 transversely of the slot 31 for the reception of a pivot 36, such depending tongue 33 being provided with a perforation 35 through which said pivot 36 extends. The lower part 28 of the clamp is provided with an arcuate surface 37 and the upper pivoted clamping member is provided with a similar surface 38 adapted to engage opposite sides of the tie rod 13. In order to hold the pivoted clamping member 34 in the position shown in Fig. 2 for clamping the tie rod, I provide the pivoted member 34 with a slot 39 through which the upper end of a bolt or stud 40 projects and upon which is threaded a nut 41 for holding the member 34 in the position shown.

One very important feature of the invention resides in spacing the king bolt 20 and the depending stud 29 a shorter distance apart than the axle and tie rod by means of which the turning action imparted to the wheels 11 is less than the turning action of the wheels of the towing vehicle so that the trailing vehicle will make a broader turn and consequently permit a short turn by the power supplying vehicle without danger of the trailing vehicle colliding with an object such as a post or the like.

It will be obvious to those skilled in the art that various changes may be made in my device, without departing from the spirit of my invention and I, therefore, do not limit myself to what is shown in the drawings and described in the specification, but only as set forth in the appended claims.

Having thus fully described my invention, what I claim as new and desire to secure by Letters Patent, is:

1. A steering device for a trailing vehicle comprising a clamp for attachment to the front axle, a clamp for attachment to the tie rod, a draft tongue pivoted to the clamp on the front axle rearwardly of said axle and a pivotal connection between the clamp on the tie rod and the draft tongue forwardly of said tie rod, substantially as set forth.

2. A steering device for a trailing vehicle comprising a member for attachment to the front axle, a member for attachment to the tie rod, a draft tongue pivoted to the member on the front axle rearwardly of said axle and a pivotal connection between the member on the tie rod and the draft tongue forwardly of said tie rod, substantially as set forth.

3. In a steering device for a trailing vehicle, means for connecting a propelling and propelled vehicle comprising a clamp for attachment to the front axle of the propelled vehicle said clamp being adjustable longitudinally of said axle, a bar pivotally connected to said clamp, a clamp for connection with the tie rod of the propelled vehicle, said clamp being adjustable longitudinally of the tied rod and means connecting said bar and said clamp whereby when the bar is oscillated on its pivot the clamp and tie rod will be moved longitudinally for steering the vehicle, the distance between the connections between the axle clamp and the tie rod clamp being less than the distance between the axle and tie rod whereby the turning of the wheels is less than the normal turning, substantially as set forth.

4. The combination of a draft tongue having a slot therein, an axle engaging member pivoted to said draft tongue, and a tie rod engaging member loosely mounted in said slot, substantially as set forth.

5. The combination of a U-shaped member, a fixed jaw mounted on one leg of said U-shaped member, a second jaw adjustably carried by the other leg of the U-shaped member, a king bolt mounted in one of said legs and projecting below said U-shaped member, a draft tongue pivoted in the lower end of said king bolt, and a tie rod engaging element loosely mounted on said draft tongue in spaced relation to said king bolt, the distance between the king bolt and the tie rod engaging member being less than the distance between the associated axle and tie rod, substantially as set forth.

In witness whereof, I have hereunto set my hand at Leeds, Alabama, this 11th day of June, A. D. nineteen hundred and twenty-seven.

JAMES OTIS BOLT.